United States Patent
Singh et al.

(10) Patent No.: US 11,657,613 B2
(45) Date of Patent: May 23, 2023

(54) ZONE BASED OBJECT TRACKING AND COUNTING

(71) Applicant: Analog Devices International Unlimited Company, Limerick (IE)

(72) Inventors: Raka Singh, Bangalore (IN); Anil M Sripadarao, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/952,477

(22) Filed: Nov. 19, 2020

(65) Prior Publication Data
US 2022/0051026 A1    Feb. 17, 2022

Related U.S. Application Data

(60) Provisional application No. 63/064,073, filed on Aug. 11, 2020.

(51) Int. Cl.
*G06V 20/52*    (2022.01)
*G08B 13/24*    (2006.01)
(Continued)

(52) U.S. Cl.
CPC ............ *G06V 20/52* (2022.01); *G06T 7/0004* (2013.01); *G06V 20/41* (2022.01); *G08B 13/19608* (2013.01); *G08B 13/248* (2013.01)

(58) Field of Classification Search
CPC ............ G06K 9/00771; G06K 9/00718; G06T 7/0004; G06T 2207/30196;
(Continued)

(56) References Cited

U.S. PATENT DOCUMENTS

| 5,708,423 A | 1/1998 | Ghaffari et al. |
| 6,427,913 B1 | 8/2002 | Maloney |

(Continued)

FOREIGN PATENT DOCUMENTS

| CN | 110659578 A | 1/2020 |
| EP | 2801956 A1 | 11/2014 |

(Continued)

OTHER PUBLICATIONS

English Translation of JP2019062531A (Year: 2017).*
(Continued)

*Primary Examiner* — Marnie A Matt
(74) *Attorney, Agent, or Firm* — Schwegman Lundberg & Woessner, P.A.

(57) ABSTRACT

This disclosure describes techniques to count objects across multiple zones of arbitrary shapes. The techniques include operations comprising: detecting an object in a first zone of a plurality of zones of an area; determining that the object has moved from the first zone to a second zone of the plurality of zones; determining that movement of the object from the first zone to the second zone fails to satisfy a zone transition criterion for updating a count value and time criterion; and in response to determining that the movement of the object from the first zone to the second zone fails to satisfy the zone transition criterion, preventing the count value from being updated.

24 Claims, 7 Drawing Sheets

(51) Int. Cl.
  *G08B 13/196* (2006.01)
  *G06T 7/00* (2017.01)
  *G06V 20/40* (2022.01)

(58) Field of Classification Search
  CPC . G06T 2207/30232; G06T 2207/30242; G06T 7/20; G08B 13/19608; G08B 13/248; G06V 20/52; G06V 20/41; G06V 20/53
  USPC .......................................................... 348/143
  See application file for complete search history.

(56) References Cited

U.S. PATENT DOCUMENTS

| | | | |
|---|---|---|---|
| 7,161,482 | B2 | 1/2007 | Rider et al. |
| 8,229,781 | B2 | 7/2012 | Zenor et al. |
| 8,957,966 | B2 | 2/2015 | Loubser et al. |
| 9,165,212 | B1 | 10/2015 | Watanabe et al. |
| 9,449,398 | B2 | 9/2016 | Saptharishi et al. |
| 9,449,506 | B1 * | 9/2016 | Whiting .......... B60W 30/18159 701/26 |
| 9,618,918 | B2 | 4/2017 | O'keeffe |
| 10,009,579 | B2 | 6/2018 | Wang et al. |
| 2005/0104727 | A1 | 5/2005 | Han et al. |
| 2007/0222595 | A1 * | 9/2007 | Motteram ............. H04W 4/029 |
| 2013/0015355 | A1 | 1/2013 | Noone et al. |
| 2014/0355829 | A1 | 12/2014 | Heu et al. |
| 2016/0314597 | A1 | 10/2016 | Wang et al. |
| 2016/0379061 | A1 | 12/2016 | Zhang et al. |
| 2019/0019017 | A1 | 1/2019 | Wang et al. |
| 2019/0035104 | A1 | 1/2019 | Cuban et al. |
| 2020/0219026 | A1 | 7/2020 | Nagarathinam et al. |
| 2020/0322916 | A1 * | 10/2020 | Ta .......................... G06Q 10/06 340/8.1 |
| 2020/0380252 | A1 * | 12/2020 | Ding ................. G08B 13/19645 |
| 2021/0074099 | A1 * | 3/2021 | Caroselli .................. G07C 9/38 |
| 2021/0133491 | A1 * | 5/2021 | Wang ..................... G06V 40/23 |
| 2022/0135039 | A1 * | 5/2022 | Jardine ................ G06V 10/764 |

FOREIGN PATENT DOCUMENTS

| | | | | |
|---|---|---|---|---|
| JP | 2019062531 | * | 9/2018 | ............... H04N 7/18 |
| WO | WO-2017196515 | A1 | 11/2017 | |
| WO | WO-2022034157 | A1 | 2/2022 | |

OTHER PUBLICATIONS

English Translation of JPH10255090A (Year: 1997).*
"International Application Serial No. PCT/EP2021/072430, International Search Report dated Nov. 25, 2021", 5 pgs.
"International Application Serial No. PCT/EP2021/072430, Written Opinion dated Nov. 25, 2021", 9 pgs.

* cited by examiner

ZONE BASED OBJECT TRACKING AND COUNTING

CROSS-REFERENCE TO RELATED APPLICATION

This application claims the benefit of priority to U.S. Provisional Application No. 63/064,073, filed on Aug. 11, 2020, which is incorporated herein by reference in its entirety.

FIELD OF THE DISCLOSURE

This document pertains generally, but not by way of limitation, to detecting objects using overhead cameras, and more particularly, to counting people or objects in an area, such as a room or a road.

BACKGROUND

People detection and counting in a room is an important task in many applications such as surveillance, building, and space management, etc. Normally, the sensor is installed at the center of the room, on the ceiling and looks downwards. This kind of installation limits the occlusion issues but introduces various other complications when attempting to detect people.

OVERVIEW

This disclosure describes, among other things, techniques to define different zones for detecting and counting objects (such as humans or vehicles) in an area, such as a conference room or a road.

In some embodiments, a system and method are described for detecting an object using one or more sensors. The system and method perform operations that include: detecting an object in a first zone of a plurality of zones of an area; determining that the object has moved from the first zone to a second zone of the plurality of zones; determining that movement of the object from the first zone to the second zone fails to satisfy a zone transition criterion for updating a count value and time criterion; and in response to determining that the movement of the object from the first zone to the second zone fails to satisfy the zone transition criterion, preventing the count value from being updated.

In some implementations, the operations further comprise: determining that movement of a second object from the first zone to the second zone satisfies the zone transition criterion and time criterion; and in response to determining that the movement of the second object from the first zone to the second zone satisfies the zone transition criterion, updating the count value representing how many objects are in the area.

In some implementations, the operations for updating the count value further comprise: incrementing or decrementing the count value in response to determining that the movement of the second object from the first zone to the second zone satisfies the zone transition criterion.

In some implementations, the operations further comprise: after the object moves from the first zone to the second zone, determining that the object was previously detected in the second zone at a point in time prior to the object being in the first zone; and in response to determining that the object was previously detected in the second zone, preventing the count value from being updated.

In some implementations, the operations further comprise: determining that the object has moved from the second zone to a third zone of the plurality of zones; storing a state of the object indicating a combination of movements across the plurality of zones; and in response to determining that the combination of movements of the object satisfies the zone transition criterion and the time criterion, updating the count value. In some implementations, the combination of movements comprises a first transition indicating movement of the object from the first zone to the second zone that is adjacent to the first zone sequentially followed by a second transition indicating movement of the object from the second zone to the third zone that is adjacent to the second zone.

In some implementations, the operations further comprise: determining that the object has moved from the second zone to a third zone of the plurality of zones; storing a state of the object indicating a combination of movements across the plurality of zones including movement of the object from the first zone to the third zone via the second zone, wherein the second zone is in a different collection of zones than the first and third zones; and in response to determining that the combination of movements of the object fails to satisfy the zone transition criterion comprising sequential movement of the object across zones in a same collections of zones without passing through a zone in a different collection of zones, preventing the count value from being updated. In some implementations, the first and third zones are in a first collection of adjacent zones and the second zone is in a second collection of adjacent zones. In some implementations, the second zone is adjacent to the first and second zones, and wherein the first zone comprises a first polygon and the second zone comprise a second polygon, wherein at least one of the first polygon or the second polygon is user defined.

In some implementations, the zone transition criterion comprises non-repeated entry into a given zone in which the object was previously detected within a time period defined by the time criterion.

In some implementations, the object comprises a human or a vehicle, and the one or more sensors comprises an image sensor, vision sensor, depth sensor, or infrared sensor in any particular orientation.

In some implementations, determining that the object has moved from the first zone to the second zone comprises: mapping a motion point corresponding to the object to a mathematical equation representing a boundary between the first and second zones; and determining, based on the mathematical equation, that the motion point has transitioned from the first zone to the second zone.

In some implementations, determining that the object has moved from the first zone to the second zone comprises: determining whether the object is inside or outside of a defined polygon area for the first zone within the time criterion; and in response to determining that the object is outside of the defined polygon area for the first zone within the time criterion, determining that the object has moved to the second zone.

In some implementations, determining that the object has moved from the first zone to the second zone comprises: mapping one or more pixel positions of the object to one or more pixel positions of the first zone; in response to determining that the one or more pixel positions of the object overlap the one or more pixel positions of the first zone, determining that the object is in the first zone; and in response to determining that the one or more pixel positions of the object overlap one or more pixel positions of the second zone after overlapping the one or more pixel positions of the first zone, determining that the object has transitioned from the first zone to the second zone.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure describes, among other things, techniques to define different zones for detecting and counting objects (such as humans or vehicles) in an area, such as a conference room or a road. This disclosure also describes techniques to avoid duplicate or false counting of objects when such objects move from one zone to another in a way that violates or fails to satisfy a zone transition criterion.

One approach can involve systems that define virtual crossing lines for triggering counting of people in a room. Namely, such systems look for a detected object to cross a virtual line to increment or decrement a counter. While such systems generally work well, they can produce inaccurate count values as a result of light changes or shadows having short tracking trajectories that cross the virtual line. Also, if the same object loiters around the virtual line, multiple counts can be triggered which further reduce the accuracy of the systems in counting the number of people in a room.

According to the disclosed embodiments, the disclosure describes a novel and resource efficient approach to count objects, such as people or vehicles, in an area based on zone transition criterion. The disclosed approach tracks an object across multiple zones along with the tracking trajectory of the object. When the object crosses multiple zones in a consistent direction, the count value is updated (incremented or decremented). Namely, the disclosed approach remembers every zone an object crosses and the trajectory of the object. If the combination of zones the object moves through matches a zone transition criterion (e.g., zone 1 has to be crossed first, followed by zone 2, and finally sequentially followed by zone 3) within a defined time constraint (time criterion), then the count value representing number of objects in an area is updated. If the object crosses zones in a way that does not satisfy the zone transition criterion or the time constraint, the count value is not updated which increases the accuracy of the system. For example, if the object crosses zone 1 and then crosses zone 3 before crossing zone 2, then the count value is prevented from being updated (e.g., even though the object ultimately advanced from zone 1 to zone 2). As another example, if the object remained in zone 1 for more than a maximum threshold period of time before advancing to zone 2, the count value is prevented from being updated. As another example, if the object remained in zone 1 for less than a minimum threshold period of time before advancing to zone 2, the count value is prevented from being updated.

Figure 1:
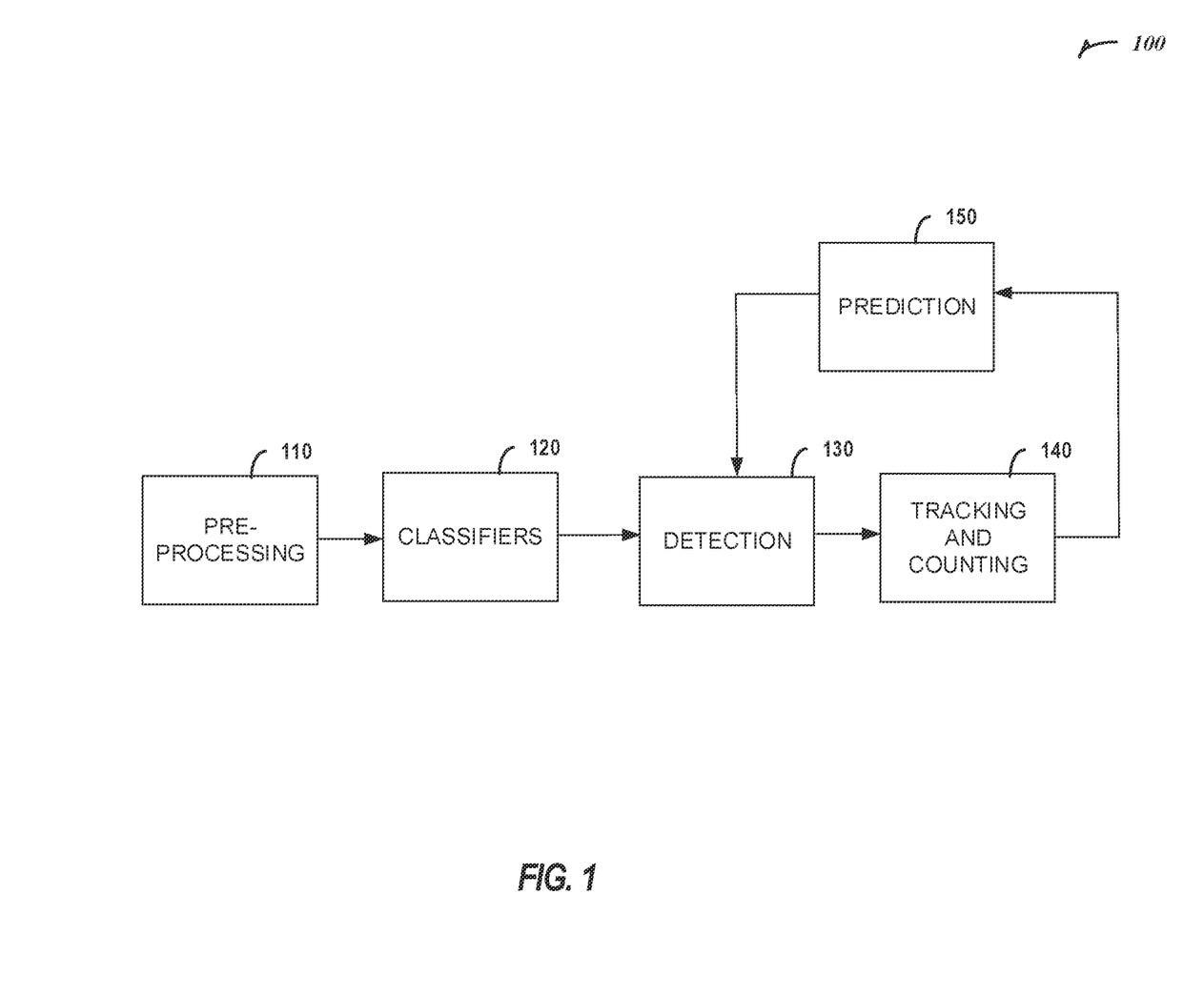
FIG. 1 is a block diagram of an example of an object detection system in accordance with various embodiments.

FIG. 1 is a block diagram of an example of an object detection system 100 in accordance with various embodiments. The object detection system 100 includes a pre-processing block 110, one or more classifiers 120, a detection block 130, a tracking and counting block 140, and a prediction block 150.

The object detection system 100 may count the number of people and their locations from a centrally mounted ceiling overhead sensor, such as a PIR sensor, vision sensor, depth sensor, infrared sensor, or any other type of sensor in any type of orientation. In some cases, the object detection system 100 is configured to count and track human people as objects within a defined time period or time constraint (e.g., time criterion). In some other cases, the object detection system 100 is configured to count and track vehicles as objects on a road within a defined time period or time constraint. In such cases, the object detection system 100 (or one or more components, such as cameras, of the system 100) may be mounted overhead on a street sign above one or more car lanes. While the disclosed system is discussed with respect to tracking and counting human objects, the disclosed system can be applied to count and track any other type of object (cars, boats, planes, animals, and so forth).

Images captured by overhead cameras (that may or may not use fisheye lenses) are free from occlusion but also suffer from the problem that key features such as face, foot, hands of objects etc. are missing or cannot be seen. Also, relying only on motion features of the objects for detection and counting may not be reliable due to noise/light changes that may be interpreted as motion and incorrectly included in the counting/tracking. Also, multiple people in close proximity may not be detected separately and detecting and tracking people who make little motion may also be challenging.

The object detection system 100 receives at the pre-processing block 110 one or more images from an overhead sensor or camera, such as a fisheye lens. The one or more images may include multiple features, such as foreground, edges, motion, and occlusion features. The pre-processing block 110 extracts the features from the images. A first pre-processing engine in the pre-processing block 110 extracts motion features and occlusion features from the images. Occlusion features are defined as pixel-level features where occluding foreground pixels are extracted. A second pre-processing engine in the pre-processing block 110 extracts foreground pixels using a Mixture of Gaussian (MOG) algorithm and augments the foreground pixels with edge foreground pixels.

For example, the first pre-processing engine computes the motion map from consecutive frames received from the overhead sensor and generates a contrast change map to identify the areas of positive contrast change and negative contrast changes. The first pre-processing engine may use a passive infrared sensor (PIR) signal during changing lights to figure out the actual motion. The first pre-processing engine computes the occlusion map (or people in foreground) based on these contrast changes and forms occlusion (foreground) entities by segmenting the occlusion map. With help of motion map segmentation along with the occlusion entities, occupancy count entities are formed. These entities represent potential people or objects. The life of these occupancy count entities depends on motion in subsequent frames.

The second pre-processing engine runs the MOG model for background and foreground (BG/FG) classification or BG/FG map. Model the background and foreground avoids learning people sitting in room as background. This can be achieved with a selective learning of the background, with masks around people such that they are not learnt as background. The output of the pre-processing block 110 produces an image in which different regions are identified as regions-of-interest that may or may not include a target object (e.g., a human or vehicle). For example, squares or other shapes of different sizes can be added by the pre-processing block 110 to the captured image to identify regions that may contain an object to be counted and/or tracked. In some embodiments, the output of the pre-processing block 110 is provided to HOG classifiers 120 to detect presence of objects in the identified regions, such as based on a position and orientation of the regions relative to the overhead camera or sensor.

In some embodiments, the occupancy count entities go through a filter where the camera geometry (human calibrated models) is used to find a modelled shape of a person in image at that point. The overlap of shape of person with occupancy count entity is done on the BG/FG map. If the shape criteria matches the requirements, these occupancy count entities are added as new tracked objects.

In each and every iteration, tracked objects are matched with occupancy count entities in the tracking and counting block 140. In some embodiments, HOG classifiers which are trained on overhead people are run in the spatial vicinity of the tracked objects. These HOG classifiers are used to boost confidence of the detections. There is a feedback mechanism where a tracked object with HOG classifier increases life of its corresponding occupancy entity.

In a post-processing engine (the detection block 130), some of the tracked objects (output by the classifiers 120) are not counted based on their history of motion, BG/FG pixels, and/or number of classifier detection patterns. Specifically, the post processing engine uses features from the second pre-processing engine of the pre-processing block 110 to extract at a lower image resolution, confidence map and motion map. The confidence map shows the confidence probability of each pixel being a person. The motion map shows the regions where there are motion features.

The post-processing engine, such as the detection block 130, computes motion regions at two different resolution of motion features, 320×240 and 80×60, to get low resolution motion blobs and high resolution motion blobs. High resolution motion blobs detect people farther away from the center, because of the increased granularity at high resolution. The output of the post-processing engine feeding into an association-tracking block, such as tracking and counting block 140, which associates over time uniquely identified motion regions. These motion regions or blobs are detected as potential people. These motion regions are fed back into a tracking module which tracks people. In this way, people who stop making motion are still detected without motion features. The tracking module also does a prediction using the prediction block 150 of location for the subsequent frame, which is fed back into the detection block 130. This allows the detection block to remove false positives or identify false negatives in subsequent frames of a video.

In some embodiments, the output of tracking is fed into a classifier based on HOG-SVM, which detects people based on HOG features which are pre-trained to create the SVM model. The classifier model increases the confidence of the tracked areas as people. Hence, areas with no motion can still be detected as people, and areas with motion like shadows etc., can be rejected as people. The extracted features such as motion, confidence, foreground, classifier detections are used together in the post processing engine (detection block 130) to remove false positives and false negatives, and to count the people.

In some embodiments, the tracking and counting block 140 of the object detection system 100 defines multiple zones in an area to track and count objects within a defined time period or time constraint. Movement of an object through the multiple zones are analyzed to determine whether to update a count value or prevent updating a count value based on whether such movements satisfy or fail to satisfy a zone transition criterion.

Figure 2A:
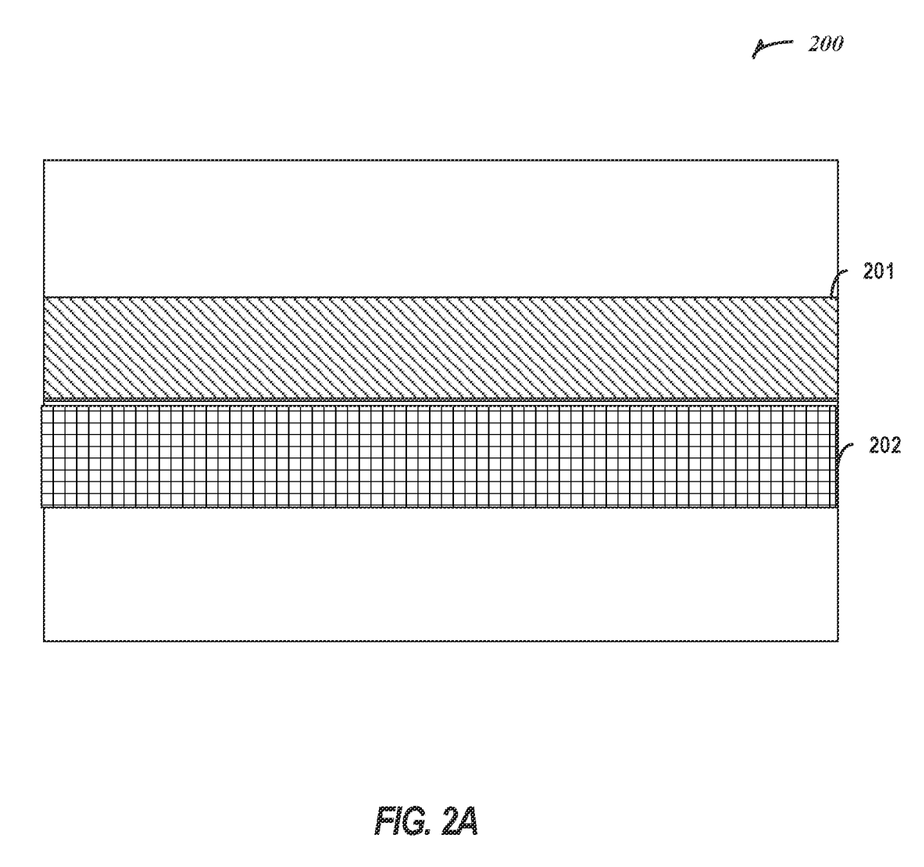
FIGS. 2A-C are example zones for counting objects in an area in accordance with various embodiments.
Figure 2B:
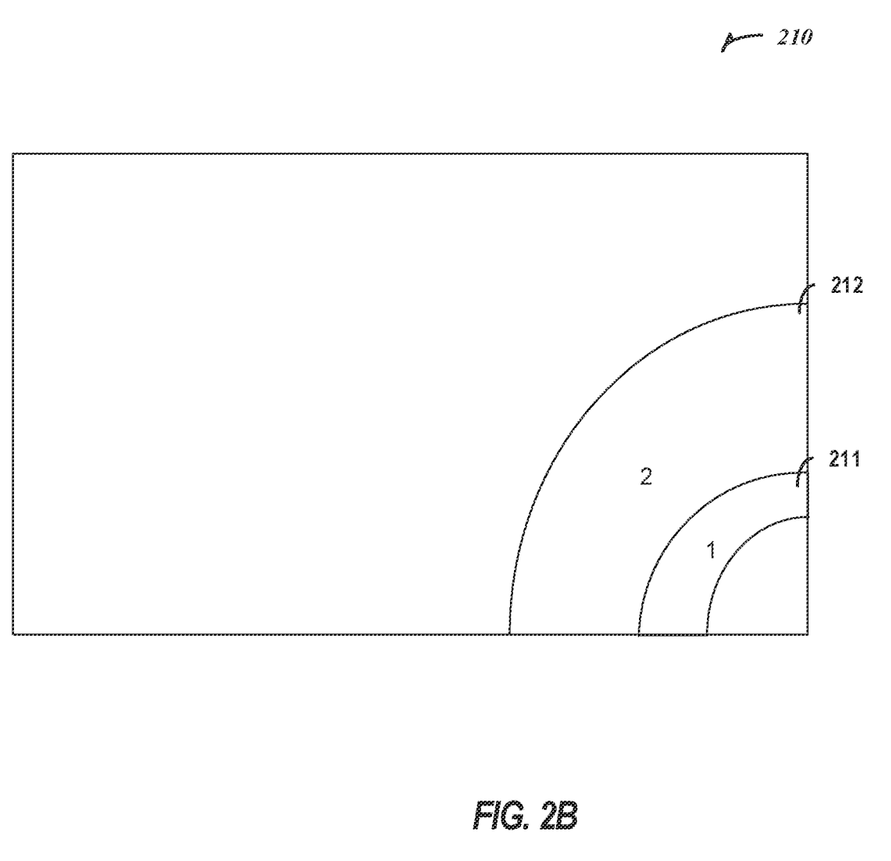
Figure 2C:
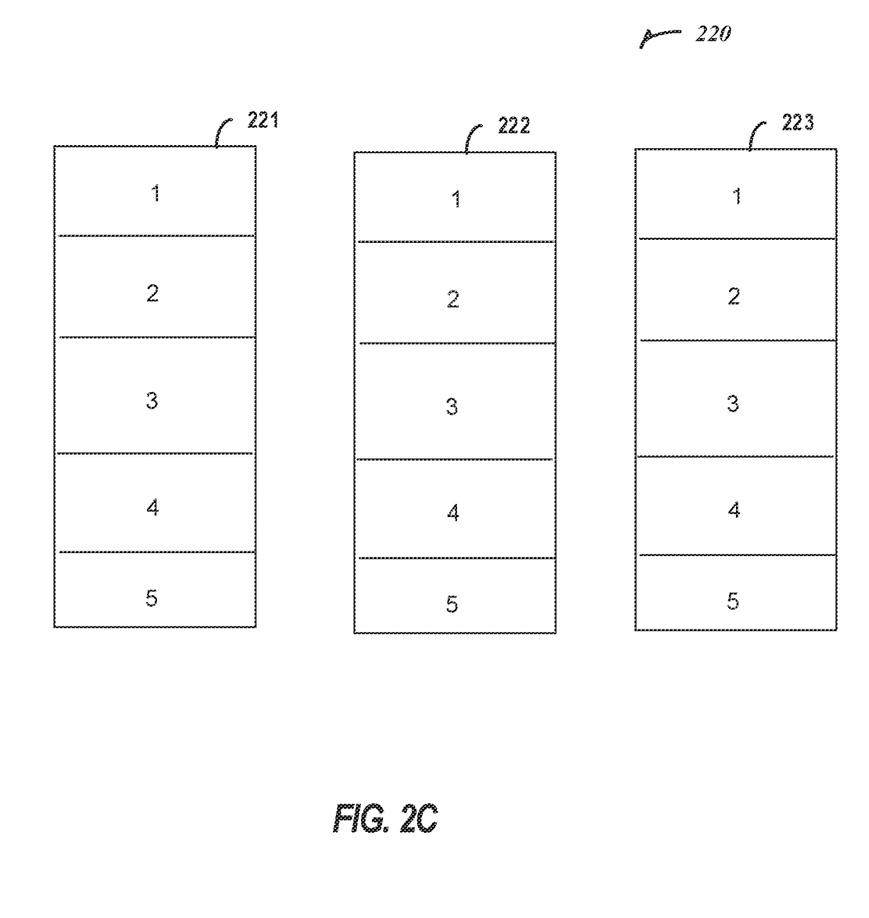

FIGS. 2A-C are example zones that are defined by the tracking and counting block 140 for counting objects in an area in accordance with various embodiments. The tracking and counting block 140 detects an object in a first zone of a plurality of zones of an area. The tracking and counting block 140 determines that the object has moved from the first zone to a second zone of the plurality of zones within a defined time period or time constraint and determines whether movement of the object from the first zone to the second zone satisfies a zone transition criterion. In response to determining that the movement of the object from the first zone to the second zone satisfies the zone transition criterion (e.g., has moved from the first zone to the second zone within a defined time period or time constraint), the tracking and counting block 140 updates a count value representing how many objects are in the area.

If the object movement fails to satisfy the zone transition criterion, the count value is not updated. In such cases, the zone transition criterion can include non-repeated entry into a given zone in which the object was previously detected within a time period defined by the time criterion. This zone transition criterion fails to be satisfied if the object moves from zone 1 to zone 2 and then back to zone 1 within a 5 minute window of time. In this circumstance, the count value is prevented from being updated (e.g., because the object was already in zone 1 less than 5 minutes before the object transitioned back to zone 1 from zone 2).

In some embodiments, the zone transition criterion can specify a certain combination of zones that have to be crossed without crossing other zone in between. As an example, such a criterion is failed to be satisfied if the object crosses zone 1 and then crosses zone 3 before crossing zone 2. In such cases, the count value is prevented from being updated (e.g., even though the object ultimately advanced from zone 1 to zone 2).

In some embodiments, the zone transition criterion can specify minimum and maximum amounts of time an object is allowed to remain or needs to remain in a given zone before transitioning to other zones. As another example, such as criterion fails to be satisfied if the object remained in zone 1 for more than a maximum threshold period of time before advancing to zone 2. In this case, the count value is prevented from being updated. As another example, if the object remained in zone 1 for less than a minimum threshold period of time before advancing to zone 2, the count value is prevented from being updated.

The tracking and counting block 140 maintains a state value for each object that is detected in the area. The state value indicates a current zone in which the object is detected, a timer representing how long the object has remained in the current zone (the timer starts when the object first crosses into the zone) and one or more previous zones the object has moved from (and the amount of time the object remained in the prior zones). The state value also indicates the trajectory of movement for the object. If the combination of zones and trajectory through which the object moves satisfies a combination of zones specified in a zone transition criterion, the tracking and counting block 140 updates the count value of the number of objects in the area. Specifically, if the object is determined to have initially moved from zone 1 to zone 2 and then has sequentially moved to zone 3 from zone 2 within a defined time period or time constraint, then the zone transition criterion is determined to be satisfied. In such circumstances, the count value is incremented. Similarly, if the object is determined to have initially moved from zone 3 to zone 2 and then has sequentially moved to zone 1 from zone 2 within a defined time period or time constraint, then the zone transition criterion is determined to be satisfied. In such circumstances, the count value is decremented. If the state value or combination of zones through which the object moved fails to satisfy the zone transition criterion, the count value is prevented from being updated or in some cases is reset.

As shown in FIGS. 2A-C, the zones can be of any polygon shape and be of different sizes. The zones can be painted by a user or drawn to be of any size and shape. For example, as shown in FIG. 2A, square shaped zones are defined for the area 200 by the tracking and counting block 140. Specifically, the area 200 includes a first rectangular zone 201 and a second rectangular zone 202. The zone transition criterion may indicate that an object has to be determined to move from the first rectangular zone 201 to the second rectangular zone 202 sequentially and then out of the second rectangular zone 202 without crossing back to the first rectangular zone 201. In such cases, the zone transition criterion may indicate that the count value is to be incremented. The zone transition criterion may indicate that an object has to be determined to move from the second rectangular zone 202 to the first rectangular zone 201 sequentially and then out of the first rectangular zone 201 without crossing back to the second rectangular zone 202. In such cases, the zone transition criterion may indicate that the count value is to be decremented. If the object moves from the first rectangular zone 201 to the second rectangular zone 202 and then back to the first rectangular zone 201 all within a given time interval (e.g., 5 minutes), the count value is prevented from being updated as such movement fails to satisfy a zone transition criterion.

Figure 3:
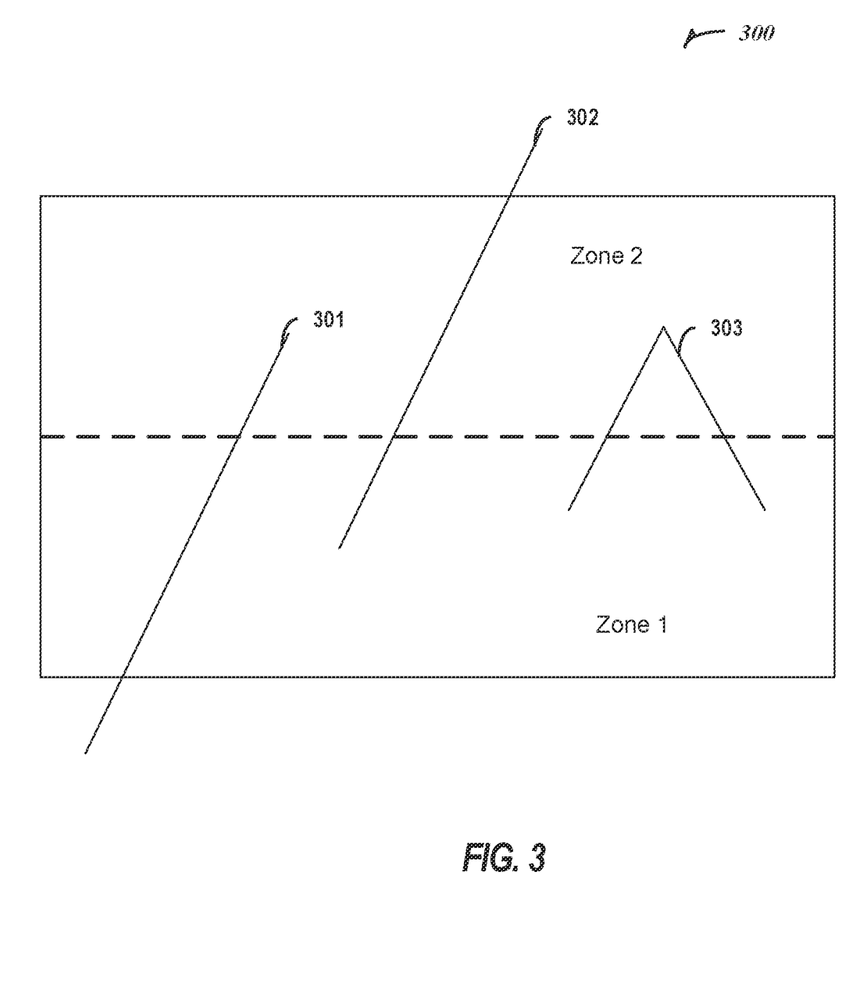
FIG. 3 is a diagram of different object transitions across zones in accordance with various embodiments.

For example, as shown in FIG. 3, a diagram 300 of object states is shown. Initially, an object is detected along a trajectory 301 from zone 1 to zone 2. In such cases, the state of the object is stored by the tracking and counting block 140. The count value may not yet be updated because the zone transition criterion is not satisfied. At a later time, the object is detected as moving along another trajectory 302 from zone 2 to outsize of the area without crossing back to zone 1 within a defined time period or time constraint. Now the zone transition criterion is satisfied and the count value is updated (incremented) for the area. Another object may be determined as moving along a given trajectory 303 in which the object is initially detected in zone 1, then moves to zone 2, and then back to zone 1 without leaving the area from zone 2 all within the given time interval (e.g., of 5 minutes). In such cases, the zone transition criterion is not satisfied and the count value is not updated (e.g., because the object moved back to zone 1 after being detected in zone 2 without first leaving the area). Namely, an object may be required to transition sequentially through a set of adjacent zones within a defined time period or time constraint in order for a count value to be incremented or decremented. If the object repeats entry into a zone in which the object was previously detected, the count value is not updated or is prevented from being updated.

Any number of additional rectangular or other shaped zones can be added to the area 200 for tracking and counting. Each zone is immediately adjacent to another zone (e.g., first rectangular zone 201 is adjacent to the second rectangular zone 202). If additional zones are added to the area 200, the zone transition criterion may be updated to require the object to move through each additional zone that is added to update the count value. For example, if a third zone (not shown) is added adjacent to the second rectangular zone 202 (adjacent to the bottom of zone 202 while the first zone 201 is adjacent to the top of zone 202), the zone transition criterion may cause the count value to be updated only in response to an object first passing from the first rectangular zone 201 to the second rectangular zone 202 and then from the second rectangular zone 202 to the newly added third zone. If the object passes from the first rectangular zone 201 to the third zone before entering the second rectangular zone 202, the zone transition criterion may not be satisfied and consequently the count value is prevented from being updated.

As another example, as shown in FIG. 2B, arc-shaped zones are defined for the area 210 by the tracking and counting block 140. Specifically, the area 210 includes a first arc-shaped zone 211 and a second arc-shaped zone 212. The zone transition criterion may indicate that an object has to be determined to move from the first arc-shaped zone 211 to the second arc-shaped zone 212 sequentially and then out of the second arc-shaped zone 212 without crossing back to the first arc-shaped zone 211. In such cases, the zone transition criterion may indicate that the count value is to be incremented. The zone transition criterion may indicate that an object has to be determined to move from the second arc-shaped zone 212 to the first arc-shaped zone 211 sequentially and then out of the first arc-shaped zone 211 without crossing back to the second arc-shaped zone 212. In such cases, the zone transition criterion may indicate that the count value is to be decremented. In some cases, an object has to remain in the first arc-shaped zone 211 for a minimum amount of time before transitioning to the second arc-shaped zone 212 in order to satisfy the zone transition criterion. If the object leaves the first arc-shaped zone 211 and enters the second arc-shaped zone 212 before remaining in the first arc-shaped zone 211 for at least the minimum amount of time, the zone transition criterion fails to be satisfied and the count value is prevented from being updated. As another example, if the object leaves the first arc-shaped zone 211 and enters the second arc-shaped zone 212 after remaining in the first arc-shaped zone 211 for more than a maximum amount of time, the zone transition criterion fails to be satisfied and the count value is prevented from being updated.

Any number of additional arc-shaped or other shaped zones (e.g., user defined shapes) can be added to the area 210 for tracking and counting. Each zone is immediately adjacent to another zone (e.g., first arc-shaped zone 211 is adjacent to the second arc-shaped zone 212). If additional zones are added to the area 210, the zone transition criterion may be updated to require the object to move through each additional zone that is added to update the count value. In some cases, an object may initially be detected in the first arc-shaped zone 211. The object may be determined to move in a trajectory towards the second arc-shaped zone 212. The object state may be updated to indicate the object is in the second arc-shaped zone 212 when the object crosses the boundary between the first and second arc-shaped zones 211 and 212. If the object moves back to the first arc-shaped zone 211 after being detected in the second arc-shaped zone 212, the count value may not be incremented. If the object moves out of the second arc-shaped zone 212 after being detected in the second arc-shaped zone 212 without moving back to a zone in which the object was previously detected (e.g., the first arc-shaped zone 211), the count value may be updated (e.g., incremented/decremented).

As another example, as shown in FIG. 2C, multiple zones are defined for the area 220 by the tracking and counting block 140. Namely, a first collection of zones 221 may correspond to a first traffic lane, a second collection of zones 222 may correspond to a second traffic lane, and a third collection of zones 223 may correspond to a third traffic lane. The tracking and counting block 140 may define a criterion that causes a count value to be updated (incremented or decremented) when an object (e.g., a vehicle or car) is detected as sequentially moving from each zone in the first collection of zones 221 (e.g., from zone 5, to zone 4, to zone 3, to zone 2, and then to zone 1 within a defined time period or time constraint) without passing through or being detected in any other zone of the second or third collection of zones 222 and 223. Similarly, the criterion may cause the same or a different count value to be updated (incremented or decremented) when an object (e.g., a vehicle or car) is detected as sequentially moving from each zone in the second collection of zones 222 (e.g., from zone 5, to zone 4, to zone 3, to zone 2, and then to zone 1) without passing through or being detected in any other zone of the first or third collection of zones 221 and 223. In some cases, separate count values may be stored and maintained for each of the first collection of zones 221, second collection of zones 222, and third collection of zones 223.

The zone transition criterion is failed to be satisfied if the object transitions from one zone in a first collection of zones to another zone in a second collection of zones before transitioning to a next adjacent zone in the first collection of zones. As an example, an object may initially be detected in zone 1 of the first collection of zones 221. The object may then be detected as moving from zone 1 of the first collection of zones to zone 3 in the second collection of zones 222. The object may then be detected as moving from zone 3 of the second collection of zones to zone 2 of the first collection of zones 221. In this circumstance, the count value for the object is prevented from being updated because the zone transition criterion fails to be satisfied. Namely, the zone transition criterion may indicate that an object has to sequentially move through a sequence of zones in one collection of zones without intermediate passing through any zone of another collection of zones. Even though the object does move through each zone in the first collection of zones, the count value is not updated because the object intermittently passed through zone 3 of the second collection of zones 222 before moving from zone 1 to zone 2 of the first collection of zones 221.

In some implementations, if the zones are rectangular or trapezoidal in shape, then the tracking and counting block 140 uses straight line equations of the form $ax+by+c=0$ to detect movement of an object from one zone to another. Specifically, the tracking and counting block 140 maps the motion point of a given object to a mathematical equation for boundaries between zones to determine whether the given object transitions from one zone to another adjacent zone. Namely, each zone may be represented by two lines. If the tracking point (x,y) in the equation $ax+by+c<0$, then the point is below the zone. If the tracking point (x,y) in the equation $ax+by+c>0$, then the point lies in the zone. The tracking and counting block 140 looks for transitions where the line equation changes sign to determine that the tracking trajectory has entered a particular segment zone. If the zones are any other shape, such as a polygon, then a closed convex polygon can be used to represent the zone. The computational geometry method of finding whether a point is inside a polygon can be used to represent the zone and detect transitions into and out of a zone for an object.

In some cases, the zones are drawn manually by a user. In other cases, the zones are automatically generated by the tracking and counting block 140. The tracking and counting block 140 analyzes the zones (that are of any defined shape) and generates boundary lines representing zone transitions. The boundary lines indicate where one zone ends and an adjacent zone begins. The tracking and counting block 140 tracks trajectory points of a given object within a particular zone and, based on the boundary lines, determines when the given object crosses the boundary line (exits one zone and enters another zone). Namely, the tracking and counting block 140 determines whether the transition of the given object satisfies a mathematical equation that defines the boundary line of the zone transitions. When the given object is determined to cross the boundary line, the tracking and counting block 140 determines whether the transition satisfies the zone transition criterion (e.g., within a given threshold of time). If so, the zone transition criterion updates a count value associated with the given object.

In some implementations, the tracking and counting block 140 can determine whether a position of a given object is inside or outside of a defined polygon area representing a zone. If the given object moves from being inside to being outside of the polygon area, the tracking and counting block 140 determines that the given object has transitioned from one zone to another zone represented by another polygon area.

In some implementations, the tracking and counting block 140 can map the position of a given object to a masked map. The masked map may represent a bit map for different zones. If the given object is within a masked map for one zone and is then determined at a later time to be within a masked map for another zone, the tracking and counting block 140 determines that the object has transitioned from one zone to another. Namely, the tracking and counting block 140 determines whether one or more pixels corresponding to the given object (or a threshold number or percentage of pixels of the object) overlap one or more pixels corresponding to a first zone. If so, the tracking and counting block 140 determines that the given object is within the first zone. At a later time (e.g., within a time criterion), the tracking and counting block 140 determines whether one or more pixels corresponding to the given object (or a threshold number or percentage of pixels of the object) overlap one or more pixels corresponding to a second zone. If so, the tracking and counting block 140 determines that the given object is within the second zone and has transitioned from the first zone to the second zone within the time criterion. In response, the tracking and counting block 140 determines whether the zone transition criterion was satisfied by the transition from the first to the second zone and accordingly updates a count value.

Figure 4:
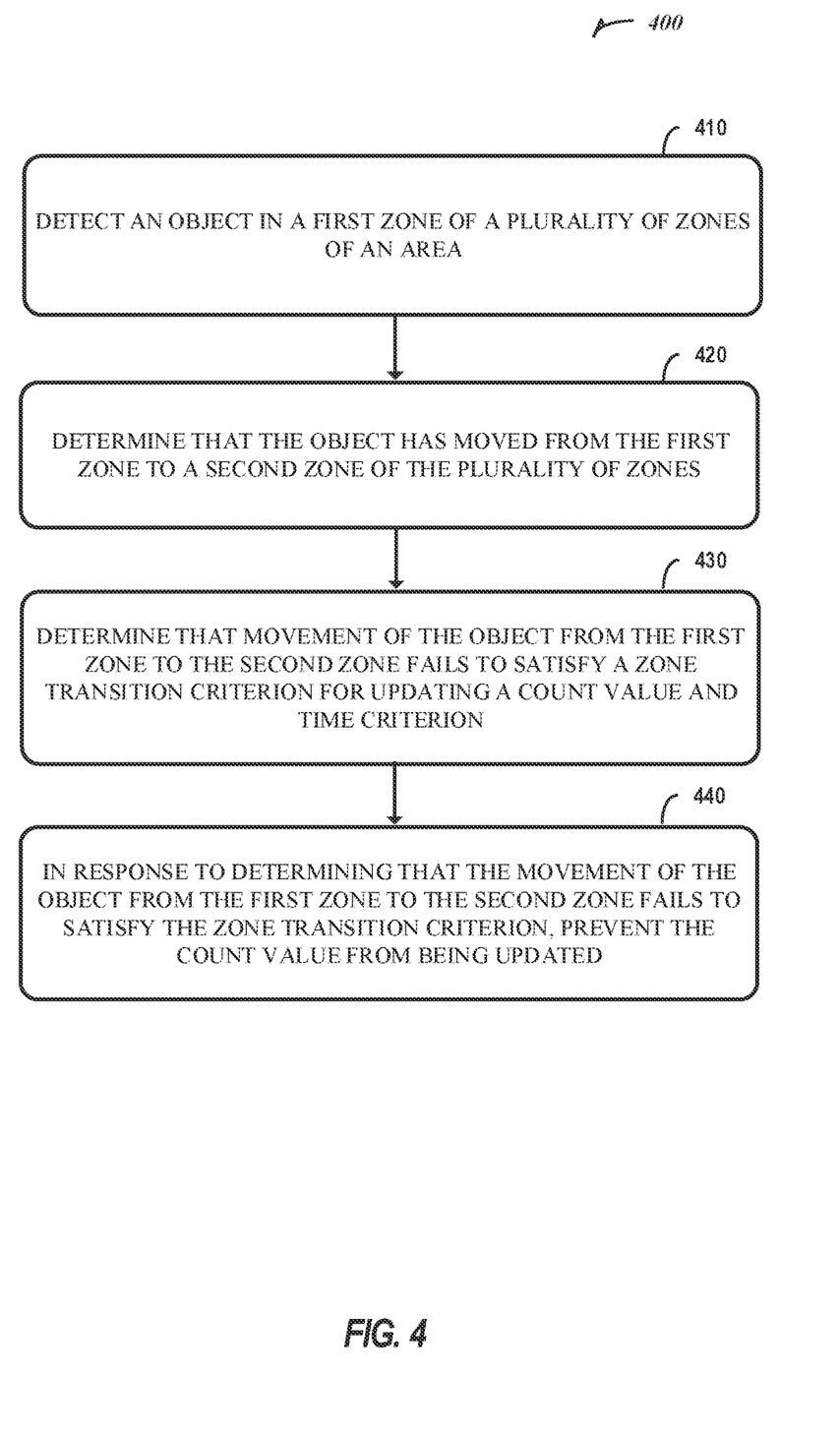
FIG. 4 is a flow diagram depicting example process for counting objects in an area in accordance with various embodiments.

FIG. 4 is a flow diagram depicting example process 400 for detecting an object in an image captured by an overhead camera in accordance with various embodiments. The operations of the process 400 may be performed in parallel or in a different sequence, or may be entirely omitted. In some embodiments, some or all of the operations of the process 400 may be embodied on a computer-readable medium and executed by one or more processors.

At operation 410, the object detection system 100 detects an object in a first zone of a plurality of zones of an area.

At operation 420, the object detection system 100 determines that the object has moved from the first zone to a second zone of the plurality of zones.

At operation 430, the object detection system 100 determines that movement of the object from the first zone to the second zone fails to satisfy a zone transition criterion for updating a count value and time criterion.

At operation 440, the object detection system 100 prevents the count value from being updated.

Figure 5:
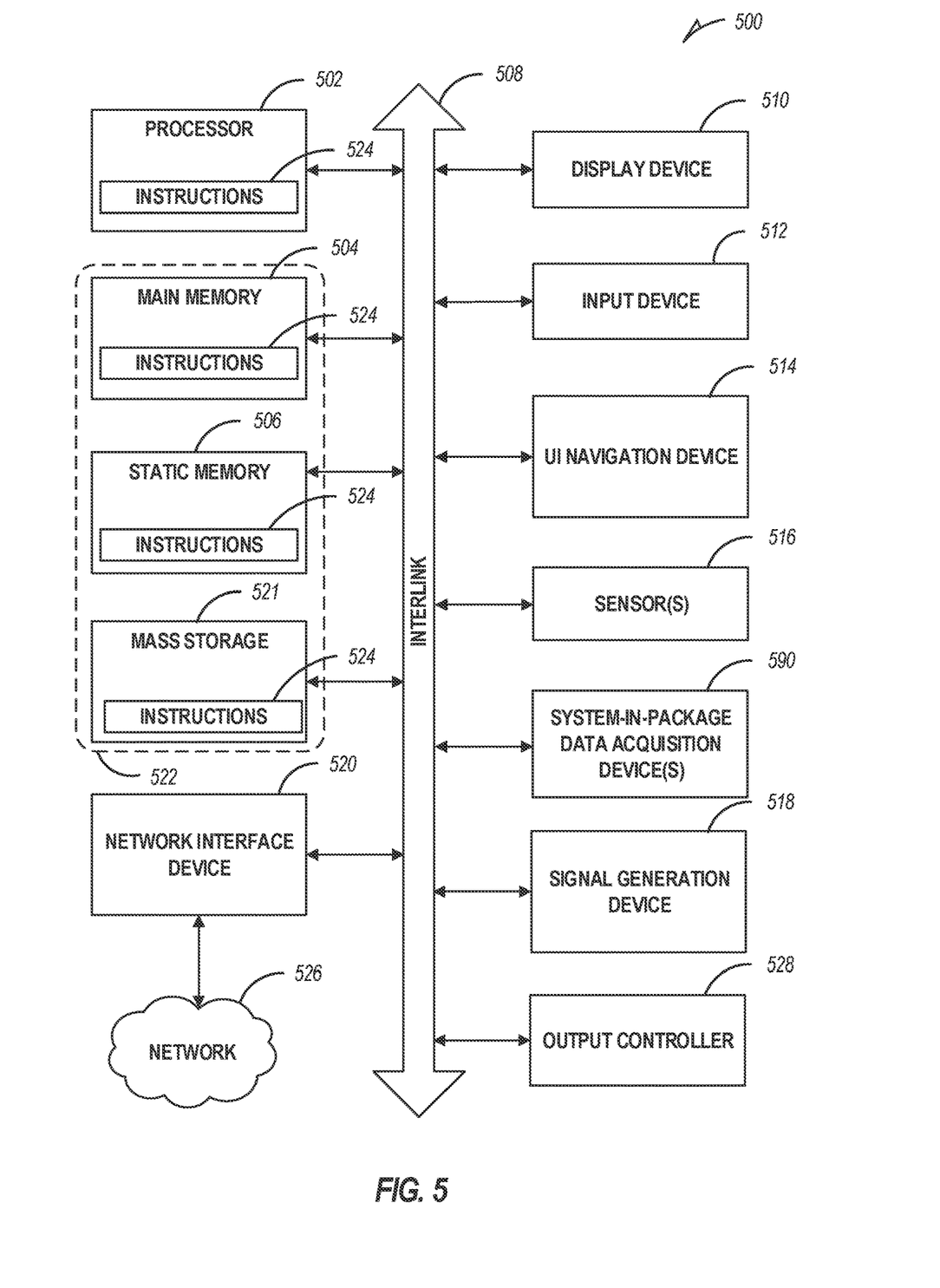
FIG. 5 is a block diagram illustrating an example of a machine upon which one or more embodiments may be implemented.

FIG. 5 is a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 500 may include a hardware processor 502 (e.g., a central processing unit (CPU), a graphics processing unit (GPU), a hardware processor core, or any combination thereof, such as a memory controller, etc.), a main memory 504, and a static memory 506, some or all of which may communicate with each other via an interlink (e.g., bus) 508. The machine 500 may further include a display device 510, an alphanumeric input device 512 (e.g., a keyboard), and a user interface (UT) navigation device 514 (e.g., a mouse). In an example, the display device 510, alphanumeric input device 512, and UI navigation device 514 may be a touchscreen display. The machine 500 may additionally include a storage device 522 (e.g., drive unit); a signal generation device 518 (e.g., a speaker); a network interface device 520; one or more sensors 516, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 590. The system-in-package data acquisition device(s) 590 may implement some or all of the functionality of the switching regulator system 100. The machine 500 may include an output controller 528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 522 may include a machine-readable medium on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 521 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 524.

The term "machine-readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521 can be accessed by the main memory 504 for use by the hardware processor 502. The main memory 504 (e.g., DRAM) is typically fast, but volatile, and thus a different type of storage from the storage device 521 (e.g., an SSD), which is suitable for long-term storage, including while in an "off" condition. The instructions 524 or data in use by a user or the machine 500 are typically loaded in the main memory 504 for use by the hardware processor 502. When the main memory 504 is full, virtual space from the storage device 521 can be allocated to supplement the main memory 504; however, because the storage device 521 is typically slower than the main memory 504, and write speeds are typically at least twice as slow as read speeds, use of virtual memory can greatly reduce user experience due to storage device latency (in contrast to the main memory 504, e.g., DRAM). Further, use of the storage device 521 for virtual memory can greatly reduce the usable lifespan of the storage device 521.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 500, and includes digital or analog communications signals or other tangible or intangible media to facilitate communication of such software.

Each of the non-limiting claims or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more claims thereof), either with respect to a particular example (or one or more claims thereof), or with respect to other examples (or one or more claims thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc. are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more claims thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

The invention claimed is:

1. A system for detecting an object using one or more sensors, the system comprising:
   a processor circuit; and
   a memory circuit for storing one or more instructions that, when performed by the processor, configure the processor to perform operations comprising:
   detecting an object in a first zone of a plurality of zones of an area, the plurality of zones comprising a first collection of zones that is parallel to a second collection of zones, the first collection of zones comprising the first zone and a second zone, the object moving along a direction through the first collection of zones;
   determining that the object has moved from the first zone to the second zone of the first collection of zones;
   determining whether movement of the object from the first zone to the second zone fails to satisfy a zone transition criterion for updating a count value in response to determining that the object has passed through a given zone in the second collection of zones, that is parallel to the first collection of zones, between being determined to move from the first zone to the second zone of the first collection of zones;
   determining whether an amount of time taken for the object to move from the first zone to the second zone fails to satisfy a time criterion for updating the count value; and
   based on determining whether the movement of the object from the first zone to the second zone fails to satisfy the zone transition criterion and based on determining whether the amount of time taken for the object to move from the first zone to the second zone fails to satisfy the time criterion, preventing the count value from being updated.

2. The system of claim 1, wherein the operations further comprise:
   determining that movement of a second object from the first zone to the second zone satisfies the zone transition criterion and time criterion; and
   in response to determining that the movement of the second object from the first zone to the second zone satisfies the zone transition criterion, updating the count value representing how many objects are in the area.

3. The system of claim 2, wherein the operations for updating the count value further comprise:
   incrementing or decrementing the count value in response to determining that the movement of the second object from the first zone to the second zone satisfies the zone transition criterion.

4. The system of claim 1, wherein the operations further comprise:
   after the object moves from the first zone to the second zone, determining that the object was previously detected in the second zone at a point in time prior to the object being in the first zone; and
   in response to determining that the object was previously detected in the second zone, preventing the count value from being updated.

5. The system of claim 1, wherein the operations further comprise:
   determining that the object has moved from the second zone to a third zone of the plurality of zones;
   storing a state of the object indicating a combination of movements across the plurality of zones; and
   in response to determining that the combination of movements of the object satisfies the zone transition criterion and the time criterion, updating the count value.

6. The system of claim 5, wherein the combination of movements comprises a first transition indicating movement of the object from the first zone to the second zone that is adjacent to the first zone sequentially followed by a second transition indicating movement of the object from the second zone to the third zone that is adjacent to the second zone.

7. The system of claim 1, wherein the first collection of zones are adjacent zones and the second collection of zones are adjacent zones.

8. The system of claim 7, wherein the first collection of adjacent zones comprises a first car lane and the second collection of adjacent zones comprises a second car lane that is adjacent to the first car lane, wherein the given zone in the second collection of zones is adjacent to the first and second zones, and wherein the first zone comprises a first polygon and the second zone comprise a second polygon, wherein at least one of the first polygon or the second polygon is user defined.

9. The system of claim 1, wherein the zone transition criterion comprises non-repeated entry into a given zone in which the object was previously detected within a time period defined by the time criterion.

10. The system of claim 1, wherein the operations further comprise:
    determining that the object remained in the first zone for less than a minimum threshold period of time before moving to the second zone to determine that the amount of time taken for the object to move from the first zone to the second zone fails to satisfy the time criterion.

11. The system of claim 1, wherein determining that the object has moved from the first zone to the second zone comprises:
    mapping a motion point corresponding to the object to a mathematical equation representing a boundary between the first and second zones; and
    determining, based on the mathematical equation, that the motion point has transitioned from the first zone to the second zone.

12. The system of claim 1, wherein determining that the object has moved from the first zone to the second zone comprises:
    determining whether the object is inside or outside of a defined polygon area for the first zone within the time criterion; and
    in response to determining that the object is outside of the defined polygon area for the first zone within the time criterion, determining that the object has moved to the second zone.

13. The system of claim 1, wherein determining that the object has moved from the first zone to the second zone comprises:
    mapping one or more pixel positions of the object to one or more pixel positions of the first zone;
    in response to determining that the one or more pixel positions of the object overlap the one or more pixel positions of the first zone, determining that the object is in the first zone; and
    in response to determining that the one or more pixel positions of the object overlap one or more pixel positions of the second zone after overlapping the one or more pixel positions of the first zone, determining that the object has transitioned from the first zone to the second zone.

14. A method comprising:
- detecting, by one or more processors, an object in a first zone of a plurality of zones of an area, the plurality of zones comprising a first collection of zones that is parallel to a second collection of zones, the first collection of zones comprising the first zone and a second zone, the object moving along a direction through the first collection of zones;
- determining that the object has moved from the first zone to the second zone of the first collection of zones;
- determining whether movement of the object from the first zone to the second zone fails to satisfy a zone transition criterion for updating a count value in response to determining that the object has passed through a given zone in the second collection of zones, that is parallel to the first collection of zones, between being determined to move from the first zone to the second zone of the first collection of zones;
- determining whether an amount of time taken for the object to move from the first zone to the second zone fails to satisfy a time criterion for updating the count value; and
- based on determining whether the movement of the object from the first zone to the second zone fails to satisfy the zone transition criterion and based on determining whether the amount of time taken for the object to move from the first zone to the second zone fails to satisfy the time criterion, preventing the count value from being updated.

15. The method of claim 14, further comprising:
- determining that movement of a second object from the first zone to the second zone satisfies the zone transition criterion and time criterion; and
- in response to determining that the movement of the second object from the first zone to the second zone satisfies the zone transition criterion, updating the count value representing how many objects are in the area.

16. The method of claim 15, further comprising:
- incrementing or decrementing the count value in response to determining that the movement of the second object from the first zone to the second zone satisfies the zone transition criterion.

17. The method of claim 14, further comprising:
- after the object moves from the first zone to the second zone, determining that the object was previously detected in the second zone at a point in time prior to the object being in the first zone; and
- in response to determining that the object was previously detected in the second zone, preventing the count value from being updated.

18. The method of claim 14, further comprising:
- determining that the object has moved from the second zone to a third zone of the plurality of zones;
- storing a state of the object indicating a combination of movements across the plurality of zones; and
- in response to determining that the combination of movements of the object satisfies the zone transition criterion and the time criterion, updating the count value.

19. The method of claim 18, wherein the combination of movements comprises a first transition indicating movement of the object from the first zone to the second zone that is adjacent to the first zone sequentially followed by a second transition indicating movement of the object from the second zone to the third zone that is adjacent to the second zone.

20. A non-transitory computer-readable medium comprising instructions that, when executed by one or more processors, configure the one or more processors to perform operations comprising:
- detecting an object in a first zone of a plurality of zones of an area, the plurality of zones comprising a first collection of zones that is parallel to a second collection of zones, the first collection of zones comprising the first zone and a second zone, the object moving along a direction through the first collection of zones;
- determining that the object has moved from the first zone to the second zone of the first collection of zones;
- determining whether movement of the object from the first zone to the second zone fails to satisfy a zone transition criterion for updating a count value in response to determining that the object has passed through a given zone in the second collection of zones, that is parallel to the first collection of zones, between being determined to move from the first zone to the second zone of the first collection of zones;
- determining whether an amount of time taken for the object to move from the first zone to the second zone fails to satisfy a time criterion; and
- based on determining whether the movement of the object from the first zone to the second zone fails to satisfy the zone transition criterion and based on determining whether the amount of time taken for the object to move from the first zone to the second zone fails to satisfy the time criterion, preventing the count value from being updated.

21. The non-transitory computer-readable medium of claim 20, the operations further comprising:
- determining that movement of a second object from the first zone to the second zone satisfies the zone transition criterion and time criterion; and
- in response to determining that the movement of the second object from the first zone to the second zone satisfies the zone transition criterion, updating the count value representing how many objects are in the area.

22. The non-transitory computer-readable medium of claim 21, the operations further comprising:
- incrementing or decrementing the count value in response to determining that the movement of the second object from the first zone to the second zone satisfies the zone transition criterion.

23. The non-transitory computer-readable medium of claim 20, the operations further comprising:
- after the object moves from the first zone to the second zone, determining that the object was previously detected in the second zone at a point in time prior to the object being in the first zone; and
- in response to determining that the object was previously detected in the second zone, preventing the count value from being updated.

24. The non-transitory computer-readable medium of claim 20, the operations further comprising:
- determining that the object has moved from the second zone to a third zone of the plurality of zones;
- storing a state of the object indicating a combination of movements across the plurality of zones; and
- in response to determining that the combination of movements of the object satisfies the zone transition criterion and the time criterion, updating the count value.

* * * * *